Oct. 11, 1932.  L. GASTWIRTH  1,882,416
AEROPLANE CONSTRUCTION
Filed Oct. 30, 1929
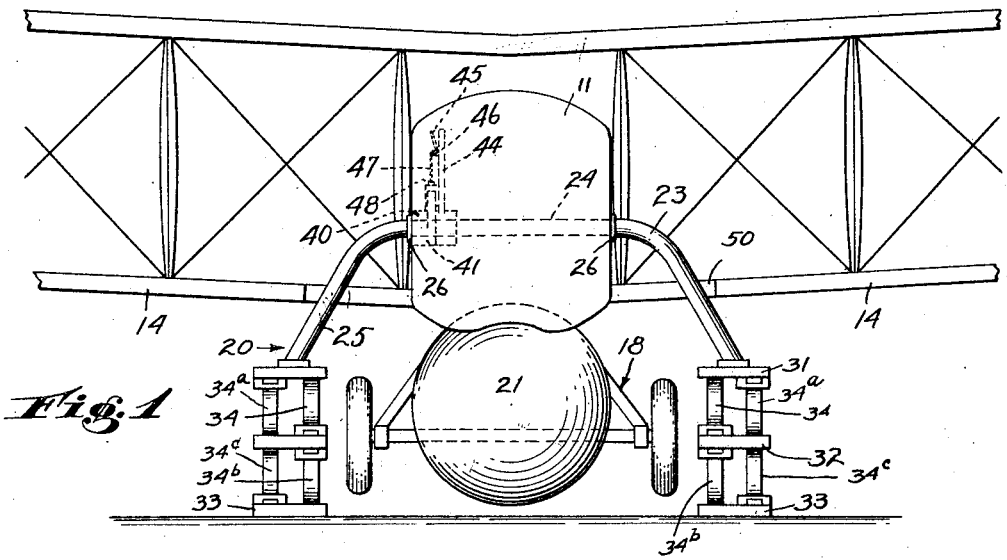
INVENTOR.
Louis Gastwirth
BY
ATTORNEYS.

Patented Oct. 11, 1932

1,882,416

UNITED STATES PATENT OFFICE

LOUIS GASTWIRTH, OF BRONX, NEW YORK

AEROPLANE CONSTRUCTION

Application filed October 30, 1929. Serial No. 403,377.

This invention relates to aeroplane construction. It is particularly directed to emergency landing gear for aeroplanes and the like conveyances.

An object of this invention is to provide an aeroplane with shock-absorbing means particularly adapted for use in emergency landings, to prevent destruction of said aeroplane as when the descent is rapid and forced so that the ordinary landing gear is hence inadequate.

A further object of this invention is to provide a neat, compact and rugged structure of the character described which shall be comparatively inexpensive to manufacture, comprise few and simple parts, easy to operate and practical and efficient to a high degree in use.

Other objects of this invention will in part be obvious and in part hereinafter pointed out.

The invention accordingly consists in the features of construction, combination of elements, and arrangement of parts which will be exemplified in the construction hereinafter described, and of which the scope of application will be indicated in the following claims.

In the accompanying drawing, in which is shown one of the various possible illustrative embodiments of this invention.

Fig. 1 is a front elevational view of an aeroplane provided with structure embodying the invention;

Fig. 2 is a side elevational, fragmentary view of the aeroplane with parts broken away to show the interior construction; and Fig. 3 is a side elevational view of the aeroplane showing the cushioning means in inflated condition.

Referring now in detail to the drawing, 10 indicates an aeroplane provided with emergency landing gear embodying the invention. The aeroplane may be of ordinary construction, and comprises generally a body 11, wings 12 interconnected by struts 15, a propeller 16 and the usual wheeled undercarriage or landing gear 18. The emergency landing gear preferably comprises spring shock-absorbing mechanism 20 and auxiliary inflated bag gas cushioning means 21, 22 to be described in greater detail hereinafter.

The mechanism 20 comprises a metal bar or rod 23 having a straight portion 24, extending through said body 11 adjacent the front or cock-pit portion thereof and a pair of downwardly and outwardly extending arms 25 projecting from the sides of said body. The portion 24 may be supported in suitable bearing members 26 fixed to the framework (not shown) of the body in any suitable manner. Attached to the lower end of each of said arms 25 in any suitable manner is a spring shock absorbing member 30. Each of said shock-absorbers 30 preferably comprises three parallel members or boards 31, 32 and 33 of gradually increasing width. Attached to said member 31 is a U-shaped spring 34 having downwardly and outwardly extending arms 35 slidably received in sleeves 36 attached to said member 32. Alongside of said spring 34 is a second spring 34a centrally attached to said member 32 and having upwardly and outwardly extending arms 35a slidably received in sleeve members 36a attached to the underside of said member 31. The boards 32 and 33 are interconnected by springs 34b and 34c similar in construction to said springs 34 and 34a and similarly connected. It will thus be seen that relative motion between members 31, 32 and 33 toward or away from each other is permitted, such movement being however resisted and retarded by the springs 34, 34a, 34b, and 34c.

Fixed to said aeroplane body 11 inside the cock-pit is a sector 40 having a portion 41 rotatably receiving the rod portion 24, and a portion 42 formed with a plurality of spaced notches 43. Fixed to said rod portion 24 adjacent said member 40 is an actuating lever 44 accessible to the operator, whereby the angular position of the shock-absorbing mechanism 20 may be adjusted by causing rotation of said rod portion 24. For fixing the mechanism 20 in various adjusted positions, there is provided a crank 45 pivoted to said lever 44 as at 46 and a slidably mounted pin or rod 47 pivoted to one end of said crank and having an end portion 48 adapted to engage within said notches 43. Thus in ordinary flight, by properly actuating the lever 44, the shock-absorbing members 30 may be swung rearwardly to idle position beneath the lower wings 14. Said wings may be provided with cut out portions 50 to permit ample swinging movement of said arms 25. When desiring to use the shock-absorbing mechanism to effect a landing, the aviator may move the lever in the proper direction for swinging the shock absorbing mechanism to any desired angle depending upon the angle at which the aeroplane is descending. Thus upon quick descent of the aeroplane, as when making an emergency landing, the shock absorbing members 30 will first strike the terrain or ground and the force of the impact will be absorbed by the springs 34, 34a, 34b, and 34c.

Auxiliary shock absorbing means in the form of inflatable flexible or elastic bags 21, 22 made of any suitable material may be provided. To this end the undersurface 55 of the aeroplane body may be provided with dome-shaped sockets 56 preferably adjacent the front end and mid-portion thereof as shown in Fig. 3 of the drawing. Said dome-shaped portions 56 are preferably formed with central openings 57 for receiving pipes 58 jointed as at 59 and communicating with a gas pump or compressed gas supply 60. A suitable valve 61 may be interposed in the pipe 59, said valve being provided with an actuating handle 62. The portion of the socket 56 adjacent the opening 57 is preferably bent backwardly as at 65 for gripping the inner edges 66 of the bags 21, 22 to effect a leak-proof seal.

Under normal conditions the bags 21 and 22 are deflated or collapsed and fit into the sockets 56. For inflating the bags 21, 22 the operator need merely open the valve 61 by actuating the handle 62 or start the operation of an ordinary gas pump in the usual manner for pumping gas under pressure into the bags. Upon landing the shock-absorbers 30 will first strike the ground. Upon said shock-absorbers however, being compressed the bags 21, 22 will strike the ground. This arrangement will hence effectively absorb shocks and serve to balance the plane upon landing as well as preventing the body of the plane from striking the ground.

Air or any other suitable gas may be used for inflating the gas bags 21, 22. Suitable exhaust means (not shown) may be provided for releasing the gas from said bags.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention I claim as new and desire to secure by Letters Patent:

1. An aeroplane comprising a body, a wheeled undercarriage for said body, a member rotatably mounted on said body and extending from the sides thereof, and a pair of spring shock absorbers adapted to contact the earth, attached to the extending portions of said members.

2. An aeroplane comprising a body, a wheeled undercarriage for said body, a separate shock absorber attached to said body adjacent the front thereof and manually operable means for pivotally adjusting the position of said shock absorber relative to said body.

3. An aeroplane comprising a body, a wheeled undercarriage for said body, a separate shock absorber attached to said body adjacent the front thereof, manually operable means for pivotally adjusting the position of said shock absorber relative to said body, and means for retaining said shock absorber in a plurality of said adjusted positions.

4. In combination with an aeroplane body, spring shock absorbers attached to said body in depending relation thereto and gas cushioning means associated with said body, said spring shock absorbers extending below said cushioning means whereby upon landing, the spring shock absorbers may become operative prior to said cushioning means.

5. In combination, an elongated aeroplane body, a wheeled undercarriage adjacent the front end of said body, separate spring shock absorbing means attached to said body adjacent said undercarriage, and an inflated cushioning member mounted beneath said body adjacent the rear end thereof, said shock absorbing means extending below said inflated member whereby upon landing said shock absorbing means may become effective prior to said inflated member.

6. An aeroplane comprising an elongated body, a wheeled undercarriage adjacent the front end of said body, separate spring shock absorbing means attached to said body adjacent said undercarriage, an inflated cushioning member mounted beneath said body adjacent the rear end thereof, and a second inflated cushioning member mounted beneath said body forwardly of said undercarriage.

7. An aeroplane comprising a body, a wheeled under-carriage attached to said body at the front thereof, a member rotatably mounted on said body adjacent the undercarriage and having portions projecting outwardly and downwardly from said body, resilient shock absorbing elements attached to the outer ends of said member, an operating arm fixed to said member and disposed within said body and means associated with said arm for retaining said member in various adjusted positions.

In testimony whereof I affix my signature.

LOUIS GASTWIRTH.